Sept. 23, 1941.  F. KUHLMAN  2,256,645
DECORATIVE MATERIAL
Filed March 28, 1941
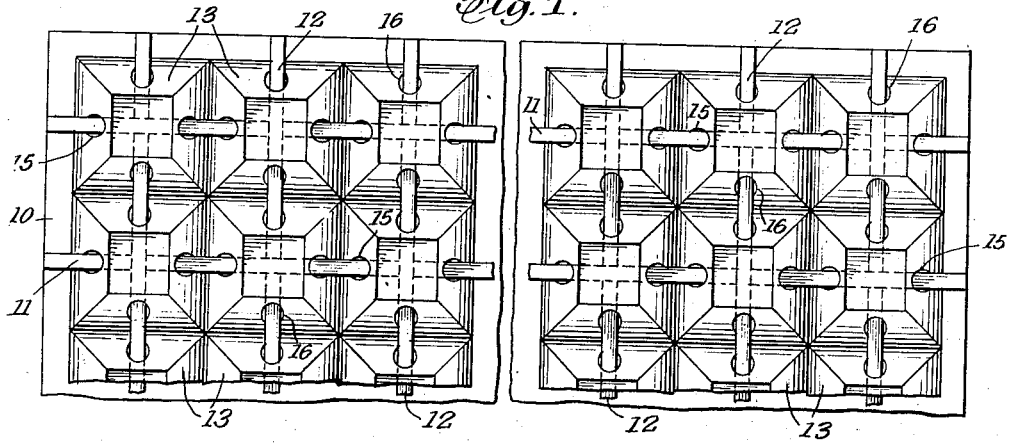
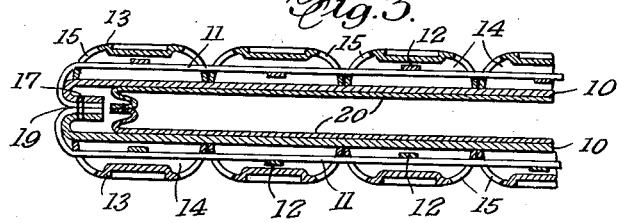
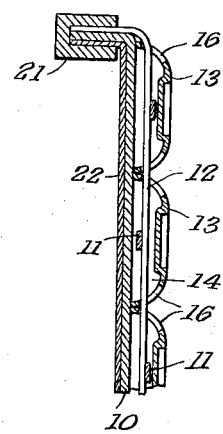
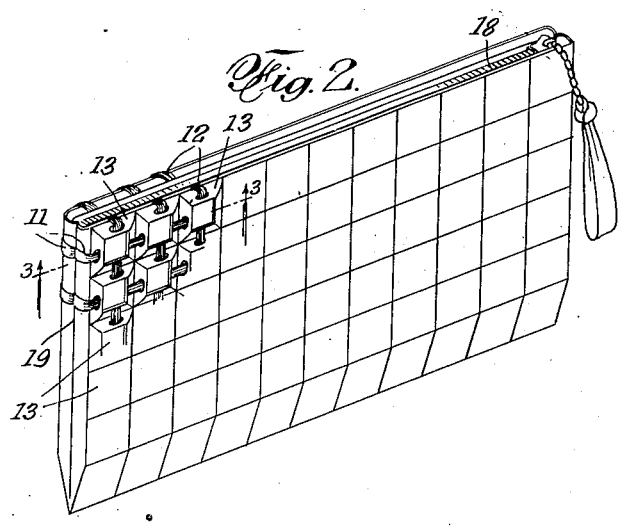
INVENTOR
FLORENCE KUHLMAN
BY
ATTORNEY Patented Sept. 23, 1941

2,256,645

UNITED STATES PATENT OFFICE 2,256,645

DECORATIVE MATERIAL

Florence Kuhlman, New York, N. Y., assignor to Robert Appel, New York, N. Y.

Application March 28, 1941, Serial No. 385,650

4 Claims. (Cl. 41—34)

This invention relates to decorative material of the type which may be employed for covering handbags, belts, and other accessory articles of apparel.

An object of the invention is to provide a decorative material which has long wearing properties, is highly attractive, and is inexpensive to manufacture.

Another object is to provide a material formed of interfitted rigid units and to so mount said units as to afford the material a high degree of articulateness.

A further object is to provide a material comprising a plurality of interfitted rigid units and pliable means interlaced with said units whereby an articulate, decorative and ornamental surface is obtained.

Other objects of the invention reside in novel means for securing said material to an accessory article of apparel.

The foregoing objects and other objects, features, and advantages of the invention will be pointed out in the following specification or will be apparent therefrom. The accompanying drawing, forming the basis for the specification, illustrates conceptions of the invention at present preferred. In said drawing:

Fig. 1 is a face view of a portion of material made in accordance with the invention.

Fig. 2 is a perspective view of a lady's handbag illustrating a preferred application of the material.

Fig. 3 is an enlarged cross-sectional view as taken on the plane of the line 3—3 of Fig. 2.

Fig. 4 is a fragmentary vertical sectional view showing an alternate manner of securing the decorative material upon a lady's handbag.

In that embodiment of the invention which is illustrated, the decorative material comprises a preferably fabric backing sheet 10, a series of spaced tapes or the like 11, a series of transversely arranged spaced tapes or the like 11, and a plurality of units 13.

The backing sheet, while preferably fabric, may be leather or any material which has a desired degree of pliability for the purpose intended.

Both series of tapes may be formed of longitudinally folded strips of fabric, leather, or like pliable material or may be strands, cords, or ropes. The tapes 11 and 12 intersect as can be seen from Fig. 1 and it is preferred that they be interwoven in the manner of basket weaving. The ends of both series of tapes may be secured to the edges of the backing sheet as by stitching, gluing, or by wire staples.

The units 13 may be suitably shaped and may be made of any rigid material. However, it is preferred to make the units of plastic compound of the nature of "Catalin," "Bakelite," "Beetleware," etc.

To reduce cost and also weight, the units 13 are each formed as a shell forming a hollow interior 14 where the tapes 11 and 12 intersect. Each unit is formed with opposed openings 15 for the tapes 11 and transverse opposed openings 16 for the tapes 12. The units may be decorated, be formed with attractive designs or shaped to provide a pleasing harmonious area as indicated in the drawing.

As can be seen, the units 13 are arranged coplanar with the openings 15 of a row thereof in alignment so that a tape 11 may be threaded through said openings and secured at its ends to the backing sheet as described. Several such rows of units, commensurate with the height of the backing sheet, are so mounted until the surface of said sheet is covered by the several rows of units. The transverse tapes 12 are similarly threaded through the aligned openings 16 and secured as before.

The units 13 are preferably in edge touching engagement as shown to obviate undue displacement movement among them and yet permitting the desired articulation. While shown as square units in the drawing, other shapes such as round, hexagonal or octagonal may be used. In the latter case, the backing sheet would become visible in the spaces between the unit, a condition which may be employed to further enhance the appearance of the material.

In the above manner a decorative material is provided which has many uses as can be well understood. A preferred use for this material is as a lady's handbag cover as represented in Fig. 2 of the drawing. Although the material thus formed is pliable it is sufficiently rigid so that it will maintain its shape unless under normal manipulation but can be articulated in the manner of a fabric or a piece of leather.

Thus, the material lends itself for use in frameless bags as shown in Figs. 2 and 3, it being merely necessary to stitch together the adjacent edges of a folded piece of said material as at 17 to form an envelope bag. Suitable closure means 18 may be provided for the bag opening. It will be noted that the ends of the tapes 11 are firmly held by the seam 19 thus formed. This may be in addition to the mentioned securing means or in lieu thereof. Similarly the ends of the tapes 12 may be secured by the stitching by means of which the closure means 18 is secured.

In the usual manner, the bag may be provided with a lining 20.

As shown in Fig. 4, in bags provided with frames, the frame 21 may serve to secure the tapes 11 and 12, the backing sheet 10, and the lining 22.

From the foregoing it may be seen that an attractive decorative material has been provided which has many uses, particularly for accessory articles of apparel. Inasmuch as this disclosure is intended as exemplary only of the invention, it should be understood that many changes within the spirit and scope of the invention as defined in the following claims may well be made by those skilled in the art.

What I claim as new and desire to secure by Letters Patent, is:

1. A decorative material comprising a backing sheet, a plurality of hollow box-like units disposed on said sheet and each formed with sloping walls, said walls having transversely arranged pairs of openings, a series of tapes each passing through the aligned pairs of openings of a row of said units, and another series of tapes arranged transversely to the first mentioned series and each passing through the other pairs of openings of the transverse rows of said units, each unit having edge contact with adjacent units, said tapes bridging the gaps between adjacent sloping walls.

2. In a decorative material, a plurality of decorative units arranged side by side each comprising a hollow rigid member having sloping sides, and pairs of opposed openings in said sides, said units being arranged with their bases in edge to edge relation, and a transverse series of interlaced tapes passing through the aligned pairs of said opposed openings to inter-connect the units.

3. A decorative material comprising a transverse series of interlaced tapes and a plurality of units strung on said tapes at their intersections and in side-by-side relation, each of said units having a top and side walls, the side walls of each unit having a portion out of line of a plane lying between the units and perpendicular to the tops thereof, said units having partial edge contact with adjacent units, and the out-of-line portions of adjacent units opposing one another to provide a gap to expose the tapes bridging the gaps between adjacent units.

4. A decorative material comprising a plurality of decorative units arranged side by side, each unit having a top and side walls, said side walls having a portion thereof out of line of a plane lying between the units and perpendicular to the tops thereof, said units having partial edge contact with adjacent units, and the out-of-line portions of adjacent units opposing one another to produce a gap between portions of the units, said units having transverse openings extending therethrough and through said out-of-line portions, a series of tapes each passing through aligned openings of a row of said units, and another series of tapes arranged transversely to the first series and each passing through the other aligned openings of the transverse rows of said units, said tapes bridging said gaps.

FLORENCE KUHLMAN.